United States Patent
Travan et al.

(10) Patent No.: US 12,440,602 B2
(45) Date of Patent: Oct. 14, 2025

(54) BIOCOMPATIBLE COMPOSITIONS COMPRISING A BIOCOMPATIBLE THICKENING POLYMER AND A CHITOSAN DERIVATIVE

(71) Applicant: Medacta International SA, Castel San Pietro (CH)

(72) Inventors: Andrea Travan, Trieste (IT); Massimiliano Antonio Borgogna, Monfalcone (IT); Matteo Parravicini, Como (IT); Angelo De Lollis, Como (IT); Francesco Siccardi, Morcote (CH)

(73) Assignee: Medacta International SA, Caster San Pietro (CH)

( * ) Notice: Subject to any disclaimer, the term of this patent is extended or adjusted under 35 U.S.C. 154(b) by 790 days.

(21) Appl. No.: 17/597,280

(22) PCT Filed: Jul. 2, 2020

(86) PCT No.: PCT/EP2020/068733
§ 371 (c)(1),
(2) Date: Dec. 30, 2021

(87) PCT Pub. No.: WO2021/001507
PCT Pub. Date: Jan. 7, 2021

(65) Prior Publication Data
US 2022/0313868 A1    Oct. 6, 2022

(30) Foreign Application Priority Data

Jul. 2, 2019   (IT) .................. 102019000010740

(51) Int. Cl.
| A61L 27/34 | (2006.01) |
| A61L 27/54 | (2006.01) |
| C08L 1/28  | (2006.01) |
| C08L 5/08  | (2006.01) |

(52) U.S. Cl.
CPC ............. *A61L 27/34* (2013.01); *A61L 27/54* (2013.01); *C08L 1/284* (2013.01); *C08L 5/08* (2013.01); *A61L 2300/104* (2013.01); *A61L 2300/404* (2013.01); *A61L 2430/24* (2013.01)

(58) Field of Classification Search
CPC .... A61L 27/34; A61L 27/54; A61L 2300/104; A61L 2300/404; A61L 2430/24; C08L 1/284; C08L 5/08
See application file for complete search history.

(56) References Cited

U.S. PATENT DOCUMENTS

| 4,424,346 A | 1/1984 | Hall et al. |
| 8,137,735 B2 | 3/2012 | Wang et al. |
| 8,241,655 B2 | 8/2012 | Chudzik et al. |
| 8,951,991 B2 | 2/2015 | Paoletti et al. |
| 2005/0079200 A1 | 4/2005 | Rathenow et al. |

(Continued)

FOREIGN PATENT DOCUMENTS

| JP | 2007-504920 A | 3/2007 |
| JP | 2007-537005 A | 12/2007 |

(Continued)

OTHER PUBLICATIONS

Ethyl cellulose; Google search (Year: 2024).*

(Continued)

*Primary Examiner* — Robert A Wax
*Assistant Examiner* — John W Lippert, III
(74) *Attorney, Agent, or Firm* — Husch Blackwell LLP

(57) ABSTRACT

Biocompatible compositions, in particular for the preparation of a biodegradable coating for medical articles, include a biocompatible thickening polymer and a chitosan derivative comprising D-glucosamine units of the following formula (I):

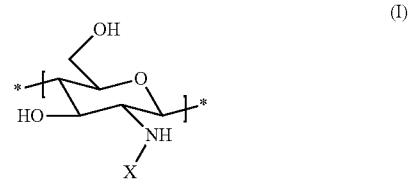

(I)

wherein X is an alditolic or aldonic polyol residue of the following formula (II):

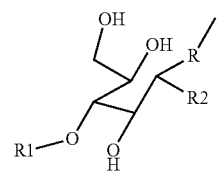

(II)

wherein:
R is $CH_2$ or CO;
R1 is hydrogen, a monosaccharide moiety or an oligosaccharide moiety;
R2 is OH or $NHCOCH_3$.

The present invention also relates to uses of the disclosed compositions, to a kit of parts including a composition in powder form and to a method for the preparation of a biocompatible composition in gel form.

The biodegradable coating shows a good and long-lasting adhesion to the surface of a medical article and allows to improve both the coating operations and the effectiveness in preventing any biofilm formation on the medical article.

19 Claims, 3 Drawing Sheets

(56) References Cited

U.S. PATENT DOCUMENTS

| | | | |
|---|---|---|---|
| 2005/0255142 A1* | 11/2005 | Chudzik | A61L 31/16 424/426 |
| 2009/0202640 A1 | 8/2009 | Paoletti et al. | |
| 2011/0123589 A1 | 5/2011 | Donati et al. | |
| 2011/0129536 A1 | 6/2011 | Donati et al. | |

FOREIGN PATENT DOCUMENTS

| | | | |
|---|---|---|---|
| JP | 2009-517488 A | 4/2009 | |
| JP | 2009-537268 A | 10/2009 | |
| JP | 2009-537597 A | 10/2009 | |
| JP | 2011-528746 A | 11/2011 | |
| WO | 2007135114 A1 | 11/2007 | |
| WO | WO-2007135116 A1 * | 11/2007 | A61L 27/20 |
| WO | WO-2010010123 A1 * | 1/2010 | C08B 37/003 |
| WO | 2010086421 A1 | 8/2010 | |
| WO | WO-2017218942 A1 * | 12/2017 | A61B 5/4875 |
| WO | 2018116224 A1 | 6/2018 | |

OTHER PUBLICATIONS

Ethyl methyl cellulose; Google search (Year: 2024).*

Japanese Office Action with English translation dated on Jun. 4, 2024 in Japanese application No. 2021-578100.

Donati I. et al., "The aggregation of pig articular chondrocyte and synthesis of extracellular matrix by a lactose-modified chitosan," Biomaterials 26, 2005, 987.

Travan A et. al., "Non-cytotoxic Silver Nanoparticle-Polysaccharide Nanocomposites with Antimicrobial Activity," Biomacromolecules 2009 10 (6), 1429-1435, DOI: 10.1021/bm900039x.

Donati I et al., "Polysaccharide-Based Polyanion-Polycation-Polyanion Ternary Systems. A Preliminary Analysis of Interpolyelectrolyte Interactions in Dilute Solutions," Biomacromolecules 2011 12 (11), 4044-4056, DOI: 10.1021/bm201046p.

Travan A. et al., "Polysaccharide-coated thermosets for orthopedic applications: From material characterization to in vivo tests," Biomacromolecules. 2012;13:1564-1572. DOI: 10.1021/bm3002683.

Cok M et al., "Mimicking mechanical response of natural tissues. Strain hardening induced by transient reticulation in lactose-modified chitosan (chitlac)," International Journal of Biological Macromolecules 2017 106, 10.1016/j.ijbiomac.2017.08.059).

Travan A et al., "Silver-polysaccharide nanocomposite antimicrobial coatings for methacrylic thermosets," Acta Biomater. Jan. 2011; 7(1) 337-346. DOI:10.1016/j.actbio.2010.07.024.

Marsich E et al., "Biological responses of silver-coated thermosets: An in vitro and in vivo study," Acta Biomater. Feb. 2013; 9(2) 5088-5099. DOI:10.1016/j.actbio.2012.10.002.

Marsich E et al., "Biological response of hydrogels embedding gold nanoparticles," Colloids Surf B Biointerfaces Apr. 2011;83(2) 331-339. DOI:10.1016/j.colsurfb.2010.12.002.

Porrelli D et al., "Antibacterial-nanocomposite bone filler based on silver nanoparticles and polysaccharides," J Tissue Eng Regen Med. Feb. 2018; 12(2):e747-e759, DOI: 10.1002/term.2365.

Chung TW et al., "Preparation of alginate/galactosylated chitosan scaffold for hepatocyte attachment," Biomaterials, vol. 23, Issue 14, 2002, pp. 2827-2834, ISSN 0142-9612, https://doi.org/10.1016/S0142-9612(01)00399-4.

Liang M et al., 2014, "The liver-targeting study of the N-galactosylated chitosan in vivo and in vitro," Artificial Cells, Nanomedicine, and Biotechnology, 42:6, 423-428, DOI: 10.3109/21691401.2013.841173.

Flemming et al., "Biofilms: an emergent form of bacterial life", Nature Reviews, Microbiology, vol. 14, Sep. 2016, 563-575.

Suh Francis J.K., Matthew H.W.T., "Application of chitosan-based polysaccharide biomaterials in cartilage tissue engineering: a review," Biomaterials, 2000, 21, 2589-2598.

D'Amelio N. et al., "Insight into the Molecular Properties of Chitlac, a Chitosan Derivative for Tissue Engineering," J. Phys. Chem. B, 2013, 177, 13578.

Miyazaki S et al. "The Use of Chitin and Chitosan as Drug Carriers," Chem. Pharm. Bull., 1981, 29, 3067-3069.

Muxika, A.; "Chitosan as a bioactive polymer: processing, properties and applications," International Journal of Biological Macromolecules; 2017; 105; 1358-1358).

* cited by examiner

BIOCOMPATIBLE COMPOSITIONS COMPRISING A BIOCOMPATIBLE THICKENING POLYMER AND A CHITOSAN DERIVATIVE

CROSS REFERENCES

This application is a U.S. National Phase application of International Application No. PCT/EP2020/068733 filed on Jul. 2, 2020, which claims priority to Italian Application No. 102019000010740 filed on Jul. 2, 2019, the disclosures of which are incorporated by reference herein in their entirety.

TECHNICAL FIELD

The present invention relates to new biocompatible compositions comprising a biocompatible thickening polymer and a chitosan derivative, which are particularly suitable for the preparation of a biocompatible, and preferably biodegradable, coating for medical articles, in particular, but not exclusively, for implantable biomedical articles.

The present invention also relates to uses of the disclosed compositions, to a kit of parts including a composition in powder form and to a method for the preparation of a biocompatible composition in gel form.

BACKGROUND

Implantable biomedical devices are artificial devices intended to replace a missing biological structure, support a damaged biological structure, or enhance an existing biological structure. Various implantable devices are nowadays available especially for use in the orthopedic and cardiovascular fields.

A serious issue frequently associated with implantable devices is the development of implant-related infections after the surgical procedure, which are currently difficult to treat with antibiotic therapy and often lead to failure of the implant, with high financial and social associated costs. Such implant-related infections still cause significant morbidity and mortality. In most cases, removal of the infected prosthesis is the only solution to treat the infection.

According to the current knowledge, probably the most critical pathogenic event in the development of implant-related infections is biofilm formation, which starts immediately after bacterial adhesion on an implant and effectively protects the microorganisms from the immune system and systemic antibiotics. A biofilm can be described as an aggregate of microbial cells embedded in a self-produced matrix of extracellular polymeric substances (EPS) and adherent to each other and/or to a surface (Flemming et al., "Biofilms: an emergent form of bacterial life", Nature Reviews, Microbiology, Vol. 14, September 2016, 563-575).

In this context, several strategies have been studied in the recent years to block biofilm formation on implanted devices by choosing suitable biomaterials to be placed at the interface between the implant and the biological tissue.

WO 2010/086421A1 to Novagenit S.r.l. discloses an antibacterial hydrogel comprising water, a hyaluronic acid derivative and an antibacterial agent, suitable for use in the orthopedic fields as a coating for prostheses or implants in the human or animal body, or else as a filler for damaged tissues. This document also discloses a method for the use of said hydrogel in orthopedic surgery and a kit for use in said method. The hyaluronic acid derivatives used to form the hydrogel are synthesized by grafting biodegradable polyesters to hyaluronic acid.

According to this reference, the antibacterial hydrogel is formed just before its use, by mixing the hydrogel with the chosen antibacterial agent in the desired ratio and shortly after injected as a filler in the damaged tissue or applied onto the surface of a prosthesis to be implanted. The injection into damaged tissues may be realized by a needle and a syringe. The application of the antibacterial hydrogel onto the prosthesis may be realized by various methods, such as by immersion of the prosthesis into the hydrogel, spraying, spreading, brushing and the like.

The kit is composed of two compositions, the first being the hydrogel formed by the hyaluronic acid derivative and water, the second being the antibacterial agent or a solution or suspension in a suitable medium of the antibacterial agent.

US 2005/0255142 A1 to Chudzik et al. discloses compositions and methods for preparing biodegradable coatings that are particularly useful for coating surfaces of implantable medical devices, such as stents and catheters, and are capable of releasing drugs from the device surface.

The coating compositions of this document include a natural biodegradable polysaccharide as a component that can be crosslinked on a surface of an implantable medical article, such as a component that can be crosslinked to form a matrix from which a drug (referred to in this document as a "bioactive agent") can be released. In some embodiments of the biodegradable matrix, a bioactive agent is present in, and can be released from, the matrix. In other embodiments, a bioactive agent is present in a biodegradable microparticle, the microparticle being immobilized within the matrix.

In preparing the coatings, a plurality of natural biodegradable polysaccharides are chemically crosslinked to each other via coupling groups that are pendent from the natural biodegradable polysaccharide (i.e., one or more coupling groups are chemically bonded to the polysaccharide), for example via a free radical polymerization reaction, thereby forming a natural biodegradable polysaccharide matrix.

WO2007135116A1 describes compositions comprising mixtures of polyanionic polysaccharides and polycationic polysaccharides consisting of oligosaccharide derivatives of chitosan. In the compositions described, the mixtures are soluble in aqueous environments, despite ionic complexes forming between the acid polysaccharides and chitosan derivatives. The document describes that the compositions have demonstrated significant rheological behaviour with an unexpected increase in viscosity and viscoelasticity, although the polysaccharides used have relatively low average molecular weights. The solubility and rheological behaviour renders the compositions suitable in particular for viscosupplementation and particularly in the field of articular pathologies and of ophthalmic surgery.

WO2010010123A1 describes nanocomposite materials in form of a three-dimensional structure formed by a polymeric matrix consisting of a polysaccharidic composition of neutral or anionic polysaccharides and a branched cationic polysaccharides, in which metallic nanoparticles are uniformly dispersed and stabilized. Using appropriate techniques of gelification or by means of an appropriate dehydration, the nanocomposite materials are three-dimensional matrices having different shapes in hydrated form as hydrogels, or in non-hydrated form. The nanocomposite materials of this document have a broad-spectrum of strong bactericidal activity, but do not show any cytotoxicity. The document asserts that the antibacterial properties associated with metallic particle nano-scale and the presence of biological signals on the polymeric chains along with the lack of cytotoxicity may be exploited in developing new-generation biomaterials provided with antimicrobial properties and for many other applications in biomedical, pharmaceutical and food field.

WO2007135114A1 describes the preparation of hydrogels or 3D matrices obtainable from aqueous solutions of mixtures of acid polysaccharides and derivatives of basic polysaccharides, such as oligosaccharide derivatives of chitosan. The solutions described are suitably gelled with either chemical or physical gelling agents with the aim of encapsulating either cells, isolated or in multicellular associations, or pharmacologically active molecules, in solution or suspension, for use in the biomedical and pharmaceutical field.

The Applicant has observed that none of the aforementioned documents affords the issue of adhesion of the disclosed coatings to the surface of the implantable medical device, which the Applicant considers instead quite an important aspect to improve both the coating operations of the surface of the implantable medical device and the effectiveness of the coating in preventing any biofilm formation.

The Applicant has also observed that the synthesis of the hyaluronic acid derivative used to form the coating of WO 2010/086421 A1 involves several chemical reactions, such as functionalization reactions, end-group activation reactions, formation of ammonium salts, and residual chemicals might be released by the coated implanted device, thereby potentially causing adverse effects in the patient.

Similar issues might arise from hydrogels disclosed in US 2005/0255142 A1, which are formed by means of cross-linking reactions and might thus retain residual chemical agents such as, for example, reticulating agents used in the cross-linking reaction.

SUMMARY

Disclosed herein are biocompatible compositions, in particular for use in the preparation of biocompatible and preferably biodegradable coatings for medical articles, in particular implantable biomedical articles, which compositions allow to impart to a biocompatible coating prepared from the same a good and long-lasting adhesion to the surface of a medical article and which allow to improve both the coating operations of the surface of the implantable medical article and the effectiveness of the coating in preventing any biofilm formation.

In particular, the inventors developed suitable compositions provided with a long-term stability as well as compositions based on the synergistic combination of a biocompatible thickening polymer and of a chitosan derivative which allow to prepare a coating of a medical article which shows a good and long-lasting adhesion to the surface thereof.

Therefore, in a first aspect, the present invention relates to a biocompatible composition in powder form comprising a biocompatible thickening polymer and a chitosan derivative comprising D-glucosamine units of the following formula (I):

wherein X is an alditolic or aldonic polyol residue of the following formula (II):

wherein:
R is $CH_2$ or CO;
R1 is hydrogen, a monosaccharide moiety or an oligosaccharide moiety;
R2 is OH or $NHCOCH_3$.

Advantageously, the biocompatible composition in powder form of the invention may be easily stored in appropriate containers even for relatively long periods of time, and easily processed, i.e. reconstituted, with a suitable aqueous reconstituting solution, to obtain a biocompatible coating composition in gel form only when needed.

More particularly, the biocompatible composition in powder form of the invention may be soluble in aqueous systems in the conditions of neutral pH and substantial ionic strength that are required in biomedical applications.

Most advantageously, the biocompatible composition in powder form of the invention may be reconstituted to achieve a biocompatible coating composition in gel form without heating at room temperature.

The Applicant has surprisingly experimentally found that the biocompatible coating composition in gel form obtained by reconstituting the composition in powder form according to the invention displays a significant and long-lasting adhesion onto a substrate, such as the surface of a medical article.

More particularly, the Applicant has experimentally found that the above biocompatible thickening polymer and chitosan derivative synergistically interact with each other to provide an enhanced adhesion to substrates of the biocompatible coating composition in gel form.

Although the Applicant does not wish to be bound by any theory, it is believed that the effect of enhanced adhesion onto the surface of a medical article may be attributed to a synergistic interaction of the biocompatible thickening polymer with the chitosan derivative which enables the hydroxyl groups carried by the flexible lateral chains of the chitosan derivative to be effectively available for non-covalent (e.g. electrostatic) interactions with hydroxyl groups exposed on the surface of the medical article, particularly those medical articles made at least in part by a metal alloy.

Advantageously, the biocompatible compositions and coatings disclosed herein are preferably biodegradable as is required for implantable biomedical devices applications.

Advantageously, the biocompatible composition in powder form of the invention employs commercially available products which do not require harsh chemical, physical and/or biochemical treatments for the preparation of the coating.

Quite advantageously, furthermore, the biocompatible composition of the invention may be tailorable in an easy manner to various specific application requirements. Thus, releasable components, such as antimicrobial agents or antibiotics, can be incorporated in the biocompatible composition when reconstituted in gel form, to be later released in vivo with a controlled profile, once a coated medical article, such as an implantable biomedical device, is implanted in a patient.

According to a second aspect, the present invention further relates to a method of preparing a biocompatible composition in gel form, particularly suitable for preparing a biocompatible coating for a medical article, comprising the steps of:
  a) providing a first container housing the composition in powder form as disclosed herein;
  b) providing a second container housing an aqueous reconstituting solution of the composition in powder form;
  c) mixing the composition in powder form and the aqueous reconstituting solution to obtain a composition in gel form; and optionally
  d) allowing the composition in gel form thus obtained to rest over a predetermined period of time.

Advantageously, this method is simple and economically advantageous, as it does not involve complex and time consuming chemical reactions, but simply requires dissolving the starting biocompatible composition in powder form in a suitable aqueous solution, and mixing until the gel thus obtained is homogeneous enough to be spread over the medical article, such as a biomedical device, to be coated.

Also, the medical staff can decide to prepare tailored aqueous solutions based on specific needs of a patient.

Moreover, according to this method, the hydrogel can be produced just before its use and, in a short term after its preparation, applied to coat the surface of a medical article. This enables, for example, the medical staff to prepare the coating on the spot, shortly before implanting the coated article.

According to a third aspect, the present invention further relates to a kit of parts for use in the preparation of a biocompatible coating in gel form for a medical article comprising:
  a first container housing a biocompatible composition in powder form as disclosed herein;
  a second container configured to house an aqueous reconstituting solution of the composition in powder form.

Advantageously, the starting composition in powder form can be provided in a standard amount and kept sterile for an extended period of time until used on the spot, right before preparation and application of the coating onto the implantable medical article.

Advantageously and as it will be illustrated in better detail hereinbelow, furthermore, the second container not only provides a receptacle for the reconstituting solution but also provides a receptacle which may aid the mixing operations of the biocompatible composition in powder form and of the reconstituting solution, thereby allowing an easy preparation of the coating composition in gel form.

According to a fourth aspect, the present invention relates to a biocompatible composition comprising a biocompatible thickening polymer and a chitosan derivative comprising D-glucosamine units of the following formula (I):

(I)

wherein X is an alditolic or aldonic polyol residue of the following formula (II):

(II)

wherein:
  R is $CH_2$ or CO;
  R1 is hydrogen, a monosaccharide moiety or an oligosaccharide moiety;
  R2 is OH or $NHCOCH_3$, and
wherein said biocompatible thickening polymer is a non-ionic cellulosic polysaccharide selected from hydroxypropyl methyl cellulose (HPMC), methyl cellulose (MC), hydroxypropyl cellulose (HPC), ethyl cellulose (EC) and ethyl methyl cellulose (EMC), or mixtures thereof.

The biocompatible composition according to this aspect of the invention, achieves the same advantages outlined above in connection with the biocompatible composition in powder form according to the first aspect, with particular reference to the significant and long-lasting adhesion onto substrate displayed by the biocompatible coating obtained from the biocompatible composition.

The Applicant has also experimentally found that a particularly effective adhesion is achieved by a synergistic interaction between the non-ionic cellulosic thickening polymer and the chitosan derivative as defined herein.

According to a fifth aspect, the present invention relates to a use of a biocompatible composition in powder form as disclosed herein, for the preparation of a biocompatible coating of a medical article.

As mentioned above, a starting biocompatible composition in powder form can be easily processed to prepare a coating composition in gel form, in particular in the form of a spreadable hydrogel, to be applied onto a medical article, according to a particularly advantageous method.

According to a sixth aspect, the present invention also relates to a use of a composition in gel form as disclosed herein as a coating for a medical article.

The present invention can have, in one or more of the aspects thereof, one or more of the preferred features described hereinafter, which can be combined with one another as desired depending on the application requirements.

Within the framework of the present description and in the following claims, all numerical values indicating amounts, parameters, percentages and so on are always to be intended as preceded by the term "about", if not otherwise stated. Moreover, all numerical value ranges include all possible combinations of the maximum and minimum numerical values and all possible intermediate ranges, besides those specifically indicated below.

Within the framework of the present description and in the following claims, the expressions "composition in gel form", "hydrogel", "gel", "gel composition" and similar are all meant to indicate a colloidal system in semi-solid, gelatinous form, consisting of a liquid phase and a solid dispersion; these expressions will be used hereinbelow interchangeably.

For the purposes of the invention, the biocompatible thickening polymer is any polymer, natural, semisynthetic or synthetic, which is compatible with the tissues of a living organism and which can act as a gelling agent (gellant), forming a gel, dissolving in a liquid phase as a colloid mixture that forms a weakly cohesive internal structure.

Suitable biocompatible thickening polymers for the purposes of the invention may be selected from polysaccharides, such as starches, vegetable gums, and pectin, proteins, or mixtures thereof.

In a particularly preferred embodiment, the biocompatible thickening polymer is non-ionic.

The Applicant has in fact observed that the effect of an enhanced adhesion of the coating composition in gel form to a substrate, such as the surface of a medical article, in particular those medical articles made at least in part of a metal alloy, is maximized when non-ionic thickening polymers are employed.

Without wishing to be bound by any theory, the Applicant believes that the non-ionic nature of the thickening polymer may substantially eliminate the possibility of any undesired ionic interactions between the chitosan derivative and the thickening polymer which may create coacervates that could hinder the availability of the hydroxyl groups carried by the chitosan derivative.

It is believed that in this way the hydroxyl groups carried by the chitosan derivative are made effectively available for non-covalent (e.g. electrostatic) interactions with the hydroxyl groups exposed on the surface of the medical article, particularly those medical articles made at least in part by a metal alloy.

In a preferred embodiment of the invention, the biocompatible thickening polymer is a non-ionic cellulosic or non-cellulosic polysaccharide.

A polysaccharide advantageously shows a well-known biocompatibility, a high versatility and large-scale commercial availability, combined with peculiar rheological properties which make it particularly useful for biomedical application.

In this regard, the Applicant observed that the possible limitations of non-ionic cellulosic or non-cellulosic polysaccharides as a biocompatible thickening polymer (limited mechanical properties of three-dimensional materials, hydrogels and scaffolds, obtained therefrom which limit in turn their possible uses in the field of osteoarticular surgery as materials for implantable devices due to strict requirements in term of mechanical strength) may be overcome by combining the non-ionic cellulosic or non-cellulosic polysaccharides with the specific chitosan derivative as disclosed herein.

In particular and as will be disclosed in greater detail hereinbelow, the Applicant observed that the biocompatible coatings prepared with the compositions according to the invention are endowed with improved mechanical properties and adhesion properties to the surface on an implantable medical device and with biocompatibility characteristics which render them suitable for interaction with biological tissues, when the medical device is implanted.

Preferably, the biocompatible thickening polymer is a non-ionic cellulosic polysaccharide selected from hydroxypropyl methyl cellulose (HPMC), methyl cellulose (MC), hydroxypropyl cellulose (HPC), ethyl cellulose (EC) and ethyl methyl cellulose (EMC), or mixtures thereof.

Most preferably, the biocompatible thickening polymer is HPMC.

In another preferred embodiment of the invention, the biocompatible thickening polymer may be a non-ionic non-cellulosic polysaccharide selected from agar-agar, locust bean gum, xanthan gum, starch and derivatives thereof, guar gum, Arabic gum, or mixtures thereof.

In a preferred embodiment of the invention, the biocompatible thickening polymer may be a protein selected from collagen, gelatin, albumin, or mixtures thereof.

Advantageously, these proteins may exert a thickening action and lend themselves to a useful application in the biomedical field.

Chitosan is a cationic polysaccharide obtained by chemical deacetylation of chitin, the main constituent of the exoskeleton of crustaceans. It consists of a straight chain of D-glucosamine (GlcNH$_2$) residues bonded by $\beta 1 \rightarrow 4$ bonds with interspersed residual N-acetyl-glucosamine units from the incomplete chitin de-acetylation, and has a molecular weight from 50 to 1,500 kDa.

This polymer may be employed in medical field as it exhibits a low immunogenic, pathologic or infective response (Suh Francis J. K., Matthew H. W. T. Biomaterials, 2000, 21, 2589-2598; Miyazaki S et al. Chem. Pharm. Bull., 1981, 29, 3067-3069; Muxika, A.; International Journal of Biological Macromolecules; 2017; 105; 1358-1358).

While chitosan has desirable features to be employed as a biomaterial due to its physical-chemical properties, such as high cationic charge density in acidic solution, its high processability and the ability to give rise to porous structures where, for example, cells may be implanted, it also has the drawback of being normally insoluble in neutral or basic aqueous solutions that are strictly required in biomedical applications.

In this regard, the Applicant observed that this drawback may be overcome by carrying out a specific derivatization of the chitosan backbone which implies, as outlined above, linking to the D-glucosamine units an alditolic or aldonic polyol residue X of the following formula (II):

wherein:
R is CH$_2$ or CO;
R1 is hydrogen, a monosaccharide moiety or an oligosaccharide moiety as disclosed herein;
R2 is OH or NHCOCH$_3$.

Advantageously, such a chitosan derivative may be obtained by means of a simple process involving mono- or oligosaccharidic structures which, through a reductive amination reaction, lead to the insertion of side branches linked to the polymeric backbone by means of secondary amino groups. This allows the overall polysaccharide positive charge of chitosan not to be substantially altered.

An exemplary process for the selective reductive amination of chitosan is disclosed in U.S. Pat. No. 4,424,346, the content of which is hereby incorporated by reference.

Alternatively, the chitosan can be derivatized with aldonic groups through the formation of amide bonds, for example through one of the processes described by either Chung T W et al., *Preparation of alginate/galactosylated chitosan scaffold for hepatocyte attachment*, Biomaterials, Volume 23, Issue 14, 2002, Pages 2827-2834, ISSN 0142-9612, https:// doi.org/10.1016/S0142-9612(01)00399-4.; or Liang M et al., 2014, The liver-targeting study of the N-galactosylated chitosan in vivo and in vitro, Artificial Cells, Nanomedicine, and Biotechnology, 42:6, 423-428, DOI: 10.3109/21691401.2013.841173.

Advantageously, the introduction of the above alditolic or aldonic polyol residue of the following formula (II) in the chitosan polymeric backbone makes the chitosan derivative totally soluble in aqueous systems even in conditions of neutral pH and substantial ionic strength, that are strictly required in biomedical applications.

Also and as already outlined above, the Applicant has experimentally found that the aforementioned chitosan derivative synergistically interacts with the thickening polymer to provide an enhanced adhesion to substrates of the biocompatible coating prepared from the composition.

In a preferred embodiment of the invention, the degree of derivatization of the chitosan derivative is between 10% and 95%, preferably between 20% and 80%, more preferably between 40% and 80%.

Most preferably, the degree of derivatization of the chitosan derivative is equal to 60%

Within the framework of the present description and of the attached claims, "degree of derivatization" is meant to indicate the ratio of substituted amine groups of the chitosan derivative over the total number of (substituted and unsubstituted) amine groups of chitosan, in other words the ratio of D-glucosamine units carrying an alditolic or aldonic polyol residue over the total number of units of chitosan.

The Applicant found that by observing the above preferred values of degree of derivatization, the biocompatible coating which may be prepared from the composition of the invention shows the best adhesion properties to the surface of a medical article, in particular an implantable medical device as disclosed herein.

For the purposes of the present invention, the degree of substitution of the chitosan derivative may be determined by means of 1H-NMR according to the procedure disclosed by Donati I. et al., Biomaterials, 2005, 26, 987; D'Amelio N. et al, J. Phys. Chem. B, 2013, 177, 13578.

In a preferred embodiment of the invention, said alditolic or aldonic polyol residue X is a residue of a monosaccharide selected from galactose, glucose, mannose, N-acetyl glucosamine and N-acetyl galactosamine.

In a preferred embodiment of the invention, said alditolic or aldonic polyol residue X is a residue of an oligosaccharide comprising from 2 to 4 glycosidic units.

Advantageously, this range of glycosidic units allows a limited steric hindrance and a good solubility of the alditolic or aldonic polyol residue X.

In a preferred embodiment, said alditolic or aldonic polyol residue X is a residue of an oligosaccharide selected from lactose, cellobiose, cellotriose, maltose, maltotriose, maltotetraose, chitobiose, chitotriose, mannobiose, melibiose, and aldonic acids thereof.

Advantageously, in all these preferred embodiments the polyol residue X is constituted by a monosaccharide or polysaccharide moiety which is part of glycosaminoglycans, which are polysaccharides normally found in the human body.

Thus, when the biocompatible coating composition in gel form according to the invention degrades in vivo, a release of such biomolecules is not harmful for the patient.

Most preferably, said alditolic or aldonic polyol residue X is a residue of lactose.

Indeed, lactose has been demonstrated to endow chitosan with peculiar physical-chemical and biological properties (Travan A et al., *Non-cytotoxic Silver Nanoparticle-Polysaccharide Nanocomposites with Antimicrobial Activity*, Biomacromolecules 2009 10 (6), 1429-1435, DOI: 10.1021/bm900039x; Donati I et al., *Polysaccharide-Based Polyanion-Polycation-Polyanion Ternary Systems. A Preliminary Analysis of Interpolyelectrolyte Interactions in Dilute Solutions*, Biomacromolecules 2011 12 (11), 4044-4056, DOI: 10.1021/bm201046p; Travan A. et al., *Polysaccharide-coated thermosets for orthopedic applications: From material characterization to in vivo tests*, Biomacromolecules. 2012; 13:1564-1572. DOI: 10.1021/bm3002683; Cok M et al., *Mimicking mechanical response of natural tissues. Strain hardening induced by transient reticulation in lactose-modified chitosan (chitlac)*, International Journal of Biological Macromolecules 2017 106, 10.1016/j.ijbiomac.2017.08.059).

In a preferred embodiment, the compositions of the invention further comprise a resuspending agent.

Advantageously, the resuspending agent increases the rate of solubility of the composition when the latter is in powder form and is reconstituted with an aqueous solution to obtain a coating composition in gel form.

Preferably, the resuspending agent is selected from mannitol, sorbitol, PEG, trehalose.

Most preferably, the resuspending agent is mannitol.

In a preferred embodiment of the composition in powder form, the amount of the resuspending agent is equal to or higher than 5% by weight and equal to or lower than 25% by weight, more preferably equal to or higher than 10% by weight and equal to or lower than 22%% by weight, of the overall weight of the composition.

In a preferred embodiment, the compositions of the invention further comprise a buffer.

Advantageously, the addition of a buffer enables to control the pH of the composition once reconstituted with an aqueous solution to obtain a coating composition in gel form having a pH compatible for biomedical applications.

Preferably, the buffer is selected from disodium phosphate (DSP—$Na_2HPO_4$), citric acid, 4-(2-hydroxyethyl)-1-piperazineethanesulfonic acid (HEPES), Phosphate-buffered saline (PBS), 2-(N-morpholino)ethane sulfonic acid (MES), 3-(N-morpholino)propane sulfonic acid (MOPS), 2-Amino-2-(hydroxymethyl)propane-1,3-diol (TRIS), Potassium phosphate dibasic ($K_2HPO_4$).

Most preferably, the buffer salt is DSP.

In a preferred embodiment of the composition in powder form, the amount of the buffer is equal to or higher than 5% by weight and equal to or lower than 15% by weight, more preferably equal to or higher than 7% by weight and equal to or lower than 13% by weight.

In a preferred embodiment, the chitosan derivative comprises metal nanoparticles dispersed thereon.

Advantageously, the addition of metal nanoparticles may confer antimicrobial or other desired properties to the composition.

The preparation of a chitosan derivative comprising metal nanoparticles dispersed thereon may be carried out in any known manner, for example according to the disclosures of US 2011/0129536 and US 2011/0123589 (corresponding to WO 2010/010123A1 briefly discussed above), the content of which is incorporated by reference herein.

In a preferred embodiment, the metal nanoparticles are selected from Ag, Cu, Zn, Au.

Antimicrobial properties of such metal nanoparticles have been demonstrated by several studies such as for example: Travan A et al., *Non-cytotoxic Silver Nanoparticle-Polysaccharide Nanocomposites with Antimicrobial Activity*, Biomacromolecules 2009 10 (6), 1429-1435, DOI: 10.1021/bm900039x; Travan A et al., *Silver-polysaccharide nanocomposite antimicrobial coatings for methacrylic thermosets*, Acta Biomater. 2011 January; 7(1) 337-346. DOI: 10.1016/j.actbio.2010.07.024; Marsich E et al., *Biological responses of silver-coated thermosets: An in vitro and in vivo study*, Acta Biomater. 2013 February; 9(2) 5088-5099. DOI:10.1016/j.actbio.2012.10.002; Marsich E et al., *Biological response of hydrogels embedding gold nanoparticles*, Colloids Surf B Biointerfaces 2011 April; 83(2) 331-339. DOI:10.1016/j.colsurfb.2010.12.002; Porrelli D et al., *Antibacterial-nanocomposite bone filler based on silver nanoparticles and polysaccharides*, J Tissue Eng Regen Med. 2018 February; 12(2):e747-e759, DOI: 10.1002/term.2365.

Most preferably, the metal nanoparticles are Ag nanoparticles so as to advantageously achieve an effective antimicrobial activity.

In a preferred embodiment of the composition in powder form, the composition comprises an amount of the biocompatible thickening polymer equal to or higher than 25% by weight and equal to or lower than 50% by weight, preferably equal to or higher than 34% by weight and equal to or lower than 48% by weight, of the overall weight of the composition.

In a preferred embodiment of the composition in powder form, the composition comprises an amount of the chitosan derivative equal to or higher than 10% by weight and equal to or lower than 40% by weight, preferably equal to or higher than 20% by weight and equal to or lower than 35% by weight, of the overall weight of the composition.

In additional preferred embodiments of the invention, the composition is in gel form.

Advantageously, such a composition is in a ready-to-use form and may be directly used to form a biocompatible coating on a medical article, preferably an implantable medical device.

As mentioned above, the composition in gel form may be either prepared on-site by reconstituting a composition in powder form or prepared at a production site.

In a preferred embodiment of the composition in gel form, the composition may further comprise a biologically-active substance.

Preferably, said biologically-active substance is a drug component.

More preferably, said drug component is an antibiotic.

In a preferred embodiment, the antibiotic is preferably selected from tobramycin, vancomycin, daptomycin, gentamicin, ciprofloxacin.

Most preferably, the antibiotic is vancomycin.

In alternative embodiments, said biologically-active substance is selected from Antimicrobial Peptides (AMPs), Platelet-rich plasma (PRP), phages and any combination thereof.

In a preferred embodiment of the composition in gel form, the amount of the chitosan derivative is equal to or higher than 1% (w/V) and equal to or lower than 5% (w/V), more preferably equal to or higher than 2% (w/V) and equal to or lower than 4% (w/V), of the overall composition.

In a preferred embodiment of the composition in gel form, the amount of the biocompatible thickening polymer is equal to or higher than 2% (w/V) and equal to or lower than 6% (w/V), more preferably equal to or higher than 3% (w/V) and equal to or lower than 5.5%, of the overall composition.

In a particularly preferred embodiment of the composition in gel form, a total amount of chitosan derivative plus biocompatible thickening polymer is higher than 3% and equal to or lower than 11% (w/V).

Advantageously, it has been experimentally observed by the Applicant that this amount of the polysaccharidic polymers of the composition allows to maximize the desired effect of an enhanced adhesion of the coating composition in gel form onto substrates, such as the surface of medical articles.

Although the Applicant does not wish to be bound by any theory, it is believed that this maximized effect may be attributed to the fact that the composition in gel form is provided with a sufficient "structure" allowing a better exploitation of the electrostatic interaction between the hydroxyl groups carried by the flexible lateral chains of the chitosan derivative and hydroxyl groups exposed on the surface of the medical article, particularly those medical articles made at least in part by a metal alloy.

More preferably, the total amount of chitosan derivative plus biocompatible thickening polymer in the composition in gel form is equal to or higher than 4.5% and equal to or lower than 11%.

Even more preferably, the total amount of chitosan derivative plus biocompatible thickening polymer in the composition in gel form is equal to or higher than 5% and equal to or lower than 11%.

Most preferably, the total amount of chitosan derivative plus biocompatible thickening polymer in the composition in gel form is equal to or higher than 5% and equal to or lower than 9.5%.

Moreover, in a preferred embodiment of the composition in gel form in which the desired effect of enhanced adhesion is best observed, a weight ratio between the chitosan derivative and the non-ionic cellulosic thickening polymer is comprised between 0.17 and 2.5.

More preferably, the weight ratio between the chitosan derivative and the non-ionic cellulosic thickening polymer is comprised between 0.6 and 1.5. In a preferred embodiment of the composition in gel form, the amount of the resuspending agent is equal to or higher than 0.5% (w/V) and equal to or lower than 3% (w/V), more preferably equal to or higher than 1% (w/V) and equal to or lower than 2.5% (w/V), of the overall composition.

In a preferred embodiment of the composition in gel form, the amount of the buffer is equal to or higher than 0.5% (w/V) and equal to or lower than 1.5% (w/V), more preferably equal to or higher than 0.7% (w/V) and equal to or lower than 1.2% (w/V), of the overall composition.

In a preferred embodiment of the method of preparing a biocompatible composition in gel form according to the invention, step b) of providing the second mixing container housing the reconstituting solution of the composition in powder form comprises:
providing said second mixing container; and
filling said second container with said reconstituting solution.

As mentioned above, the medical staff can decide prepare tailored aqueous solutions based on specific needs of a patient.

Thus, in a preferred embodiment of the method of preparing a biocompatible composition in gel form according to the invention the aqueous reconstituting solution comprises water and optionally a biologically-active substance, such as one of the biologically-active substance described herein, preferably an antibiotic.

In a preferred embodiment of the method of preparing a biocompatible composition in gel form according to the invention, the mixing step c) comprises:

c1) feeding the aqueous reconstituting solution from the second container to the first container to dissolve the composition in powder form;
c2) feeding the reconstituted composition back into the second container;
c3) optionally, repeating steps c1) and c2) so as to increase homogeneity of the reconstituted composition in gel form.

In this way, the biocompatible composition in gel form may be easily prepared on the spot by the medical staff by using well known procedures such as those indicated in the art with the term of inter-syringe mixing.

In a preferred embodiment of the method of preparing a biocompatible composition in gel form according to the invention, step d) provides for allowing the reconstituted composition in gel form to rest for time equal to at least about 5 minutes.

More preferably, step d) provides for allowing the reconstituted composition in gel form to rest for time equal to or higher than 5 minutes and equal to or lower than 4 hours, preferably equal to or higher than 7 minutes and equal to or lower than 1 hour.

Advantageously, this rest time allows the composition to have an optimal level of rehydration and swelling.

Within the framework of preferred embodiments of the present invention, the medical article is an implantable biomedical article.

Preferably, the implantable biomedical article may be an articular prosthesis made at least in part of a metal alloy.

More preferably, said metal alloy is a titanium alloy.

In preferred embodiments of the present invention, the articular prosthesis may be a hip prosthesis or a knee prosthesis.

More preferably, the articular prosthesis is a hip prosthesis.

In a preferred embodiment of the kit of parts for use in the preparation of a biocompatible coating in gel form for a medical article, the aforementioned second mixing container houses a reconstituting solution as described herein.

Advantageously, this preferred embodiment of the kit of parts allows to eliminate the need for the medical staff to prepare the reconstituting solution in advance before a surgical operation. A suitable sterile reconstituting solution is already present within the second container and, in order to obtain the biocompatible composition in gel form for use to form a coating on the medical article, only the mixing step, and optionally the resting step, have to be carried out.

In a preferred embodiment of the kit of parts according to the invention, the kit of parts may further comprise a watertight connector configured to connect in a sealed manner the first container to the second container.

In this way, the content of the two containers can be easily transferred back and forth (steps c1) and c2) of the preferred embodiment of the method mentioned above) in a sterile manner and without any leaks of material.

In a preferred embodiment of the kit of parts according to the invention, the kit of parts may further comprise a spatula configured to apply the biocompatible coating in gel form onto a medical article.

Advantageously, the spatula may be used to apply the gel composition and to spread it homogeneously onto the surface of a biomedical device according to the best practices of the medical art.

BRIEF DESCRIPTION OF THE FIGURES

Further characteristics and advantages of the invention will become clearer from the following description of some preferred embodiments thereof, made hereinafter, for indicating and not limiting purposes, with reference to the attached drawings. In such drawings.

DETAILED DESCRIPTION

In order to assess the performance of biocompatible compositions according to the invention, various experiments have been carried out, some of which are reported below, to be intended for illustrative and non-limiting purpose of the present invention.

Example 1—Preparation of a Composition in Powder Form 150 mg of a chitosan derivative obtained from the reaction between chitosan and lactose (CTL) with a degree of derivatization of 60% and according to the procedure described by International patent application WO 2018/116224 A1, 250 mg of HPMC, 100 mg of mannitol and 45 mg of $Na_2HPO_4$ were mixed by means of a spatula and loaded into a 5 ml syringe to obtain a composition in powder form.

Example 2—Preparation of a Composition in Powder Form 150 mg of a chitosan derivative obtained from the reaction between chitosan and lactose (CTL) as described in Example 1 and having a degree of derivatization of 60%, 200 mg of HPMC, 100 mg of mannitol and 45 mg of $Na_2HPO_4$ were mixed by means of a spatula and loaded into a 5 ml syringe to obtain a composition in powder form.

Example 3—Preparation of a Composition in Powder Form 200 mg of a chitosan derivative obtained from the reaction between chitosan and lactose (CTL) as described in Example 1 and having a degree of derivatization of 60%, 150 mg of HPMC, 100 mg of mannitol and 45 mg of $Na_2HPO_4$ were mixed by means of a spatula and loaded into a 5 ml syringe to obtain a composition in powder form.

Example 4—Preparation of a Composition in Powder Form 150 mg of a chitosan derivative obtained from the reaction between chitosan and lactose (CTL) as described in Example 1 and having a degree of derivatization of 47%, 100 mg of HPMC and 150 mg of mannitol were mixed by means of a spatula and loaded into a 5 ml syringe to obtain a composition in powder form.

Example 5—Preparation of a Composition in Powder Form 150 mg of a chitosan derivative obtained from the reaction between chitosan and lactose (CTL) as described in Example 1 and having a degree of derivatization of 60%, 100 mg of HPMC and 150 mg of mannitol were mixed by means of a spatula and loaded into a 5 ml syringe to obtain a composition in powder form.

Example 6—Preparation of a Composition in Powder Form 150 mg of a chitosan derivative obtained from the reaction between chitosan and lactose (CTL) as described in Example 1 and having a degree of derivatization of 77%, 100 mg of HPMC and 150 mg of mannitol were mixed by means of a spatula and loaded into a 5 ml syringe to obtain a composition in powder form.

Example 7—Exemplary Scale-Up of a Composition in Powder Form: Preparation of the Composition of Example 1 for a Batch of 100 Containers 15 g of a chitosan derivative obtained from the reaction between chitosan and lactose (CTL) as described in Example 1 and having a degree of derivatization of 60%, 25 g of HPMC, 10 g of mannitol, 4.5 g of $Na_2HPO_4$ were mechanically mixed by means of a V-type blender Multigel Junior, manually weighted and aliquoted into 100 syringes, each syringe containing 545 mg of the mixed powders, to obtain a composition in powder form.

A scaled-up production of the composition according to the invention appears to be feasible in terms of performing a mixing procedure for the components at the solid state, in line with similar processes employed in the pharmaceutical/biomedical field, thereby allowing a possible transfer of the production of the medical devices to the industrial site.

This approach allows rapid operations of preparation and aliquoting into syringes of the composition, which can be easily transferred to the industrial site.

Example 8—Preparation of a Composition in Powder Form Comprising Silver Nanoparticles 123 mg of a chitosan derivative obtained from the reaction between chitosan and lactose (CTL) as described in Example 1 and having a degree of derivatization of 60%, 27 mg of the same chitosan derivative bearing silver nanoparticles (CTL-nAg, in which silver amount is 0.2% w/w), 250 mg of HPMC, 100 mg of mannitol and 45 mg of $Na_2HPO_4$ were mixed by means of a spatula and loaded into a 5 ml syringe to obtain a composition in powder form.

The chitosan derivative bearing silver nanoparticles (CTL-nAg) was prepared as described by Travan A et. Al., Non-cytotoxic Silver Nanoparticle-Polysaccharide Nanocomposites with Antimicrobial Activity, Biomacromolecules 2009 10 (6), 1429-1435, DOI: 10.1021/bm900039x.

Examples 9A-9G—Preparation of Compositions in Gel Form

Seven compositions in gel form were obtained by resuspending in aqueous solution, by means of inter-syringe mixing using two containers as disclosed above, a composition in powder form prepared according to Examples 1-6 and 8.

Seven syringes (first containers) each containing one of said compositions in powder form were coupled with other seven syringes (second containers) each containing 5 ml of water and then the compositions in powder form were gradually rehydrated by inter-syringe mixing as known in the art by feeding the materials back and forth between the coupled syringes until a total rehydration of the powder compositions occurred and substantially homogeneous gels, as determined by visual inspection, were obtained.

The compositions in gel form thus obtained were allowed to rest for about 10 minutes so as to make the hydrogels settle.

In the following Table 1, the amounts of chitosan derivative and thickening polymer in the composition in gel form prepared are reported:

TABLE 1

|  | Amount of chitosan derivative (w/V) | Amount of chitosan derivative bearing silver nanoparticles (w/V) | Amount of thickening polymer (w/V) | Total amount of chitosan derivative plus thickening polymer (w/V) |
| --- | --- | --- | --- | --- |
| Example 9A | 3 | — | 5 | 8 |
| Example 9B | 3 | — | 4 | 7 |
| Example 9C | 4 | — | 3 | 7 |
| Example 9D | 3 | — | 2 | 5 |
| Example 9E | 3 | — | 2 | 5 |
| Example 9F | 3 | — | 2 | 5 |
| Example 9G | 2.46 | 0.54 | 5 | 8 |

Examples 10A-10F—Preparation of Compositions in Gel Form Having Antimicrobial Activity Six compositions in gel form containing antimicrobial molecules were obtained by resuspending in aqueous solution containing vancomycin (20 mg/ml), by means of inter-syringe mixing, compositions in powder form prepared according to Examples 1-6.

Six syringes (first containers) each containing one of said compositions in powder form were coupled with other six syringes (second containers) each containing 5 ml of a vancomycin aqueous solution (20 mg/ml), and then the compositions in powder form were gradually rehydrated by inter-syringe mixing as known in the art by feeding the materials back and forth between the coupled syringes until a total rehydration of the powder compositions occurred and substantially homogeneous gels, as determined by visual inspection, were obtained.

The reconstituted compositions in gel form were allowed to rest for about 10 minutes so as to make the hydrogels settle.

Example 11—Determination of the Rheological Behavior of the Compositions in Gel Form Mechanical spectroscopy of a composition in gel form prepared according to Example 9A (and sterilized by beta irradiation) was carried out in order to determine the elastic modulus (G'), the viscous modulus (G') and the complex viscosity ($\eta^*$) of said composition in gel form.

The rheological properties of the hydrogel were studied with a controlled stress rheometer Haake Mars III and the values of storage (elastic, G') and loss (viscous, G") moduli were measured at 2.5 Hz, while the complex viscosity ($\eta^*$) was evaluated at 1 Hz. All measurements were performed at 25° C. using a cone-plate geometry ($\phi$=60 mm, 1°)

Figure 1:
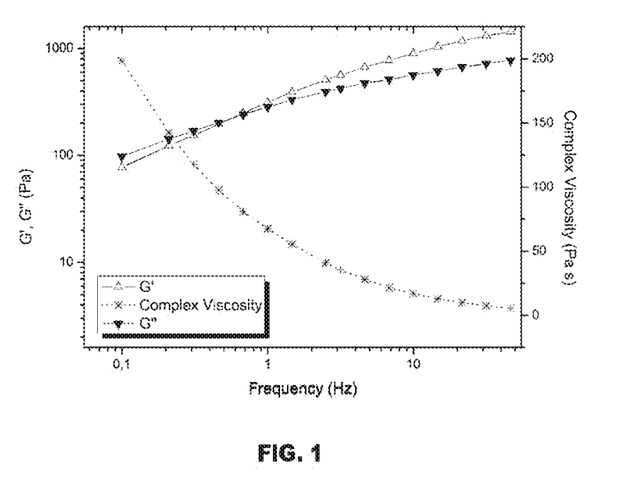
FIG. 1 shows the results of rheological tests performed according to Example 11 on the biodegradable coating prepared according to Example 9A.

The results obtained are shown in FIG. 1, and showed a dependency of the elastic modulus G', the viscous modulus G" and complex viscosity $\eta^*$ on the frequency; notably for a wide range of frequencies the elastic modulus G' is higher than the viscous one G", showing a good compactness on the hydrogel Example 12—Diffusion of an Antimicrobial Drug from the Composition in Gel Form with Antimicrobial Molecules Antimicrobial drug release tests were performed using a composition in gel form according to Example 10A obtained by reconstituting a composition in powder form according to Example 1 (and sterilized by beta irradiation), with an aqueous solution containing vancomycin (20 mg/ml), and by measuring the vancomycin release over time.

The composition in gel form (500 mg per sample) was spread on titanium cylinders and immersed in PBS (7 ml) at 37° C. At selected time-points (1, 4, 8 and 24 hours), the supernatant solution was collected and analysed to measure the amount released. Three samples were used for each selected time points and the results obtained were averaged.

The quantification of vancomycin in the supernatant solutions was performed by means of UV-Vis spectrometry, after having obtained a calibration curve.

Figure 2:
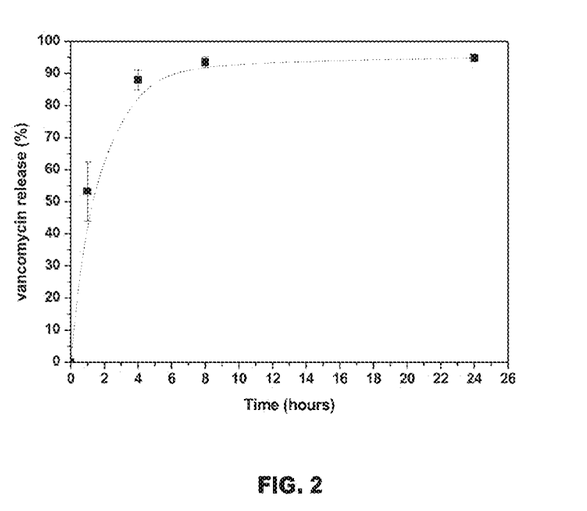
FIG. 2 shows the diffusion of an antimicrobial drug (vancomycin), evaluated according to Example 12, from the biodegradable coating prepared according to Example 10A.

FIG. 2 shows the release profiles of vancomycin from the composition in gel form according to Example 10A (black squares).

The graph shows that vancomycin could be gradually released from the hydrogel during the first immersion hours, while the total release appears to be reached after 24 hours.

Example 13—Diffusion of Silver from the Composition in Gel Form with Silver Nanoparticles Silver release tests were performed using a composition in gel form prepared according to Example 9G, by rehydrating the composition in powder form according to Example 8 (beta-sterilized at medium dose), with aqueous solution, and by measuring the silver release over time. The silver concentration of the final composition in gel form was 0.1 mM.

The rehydrated composition in gel form (500 mg per sample) was spread on titanium cylinders and immersed in PBS (7 ml) at 37° C. At selected time-points (1, 4, 8 and 24 hours), the supernatant solution was collected and analyzed to measure the amount released. Three samples were used for each selected time points and the results obtained were averaged.

The quantification of silver in the supernatant solutions was performed by means of Atomic Emission Spectroscopy (AES).

Figure 3:
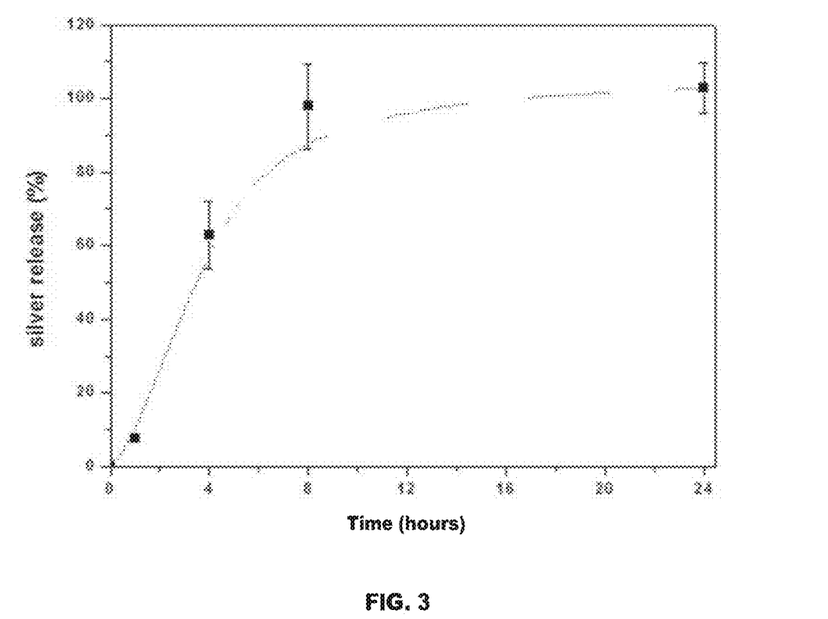
FIG. 3 shows the diffusion of silver nanoparticles, evaluated according to Example 13, from the composition in gel form prepared according to Example 9 by resuspending in aqueous solution the composition containing silver nanoparticles obtained according to Example 8.

FIG. 3 shows the release profile of silver from the hydrogel (black squares).

The graph shows that silver could be gradually released from the hydrogel during the first immersion hours, while the total release appears to be reached after 24 hours.

Example 14 (Comparative)—Preparation of a Composition in Gel Form not Containing any Chitosan Derivative 150 mg of mannitol and 100 mg of HPMC were mixed by means of a spatula and loaded into a 5 ml syringe to obtain a comparative composition in powder form.

The composition in powder form was used to obtain a comparative composition in gel form by means of inter-syringe mixing according to the procedure disclosed in any one of Examples 9A-9F.

Example 15 (Comparative)—Preparation of a Composition in Gel Form not Containing any Biocompatible Thickening Polymer 150 mg of a chitosan derivative obtained from the reaction between chitosan and lactose (CTL) as described in Example 1 and having a degree of derivatization of 60% and 150 mg of mannitol were mixed by means of a spatula and loaded into a 5 ml syringe to obtain a composition in powder form.

The composition in powder form was used to obtain a comparative composition in gel form by means of inter-syringe mixing according to the procedure disclosed in any one of Examples 9A-9F.

Example 16—Quantification of the Adhesive Properties of a Composition in Gel Form According to the Invention and of Comparative Compositions A quantification of the adhesive properties of a composition in gel form according to the invention (Example 9A) and of the comparative compositions of Examples 14 and 15 was carried out with the following method.

Each composition in gel form was spread on a titanium plate having the following approximate dimensions:
length: 80 mm
width: 20 mm
thickness: 1 mm The volume of hydrogel used for each test was 1.5 ml and the material was rubbed on the metal surface with a spatula in order to achieve a uniform coating layer having a thickness of about 1 mm A water nozzle was placed 10 cm above the higher extremity of the hydrogel spread on the titanium plate inclined at 30° with respect to the water stream which was directed onto the upper end of the coating layer at a flow rate of 1.5 l/min for 30 seconds.

The amount of each coating layer was quantified before and after water rinsing in terms of surface coverage (computerized image analyses carried out by the software Image J on digital pictures of the top views of the coated plates) and weight.

The weight of the residual coating was measured after freeze-drying so as to convert the compositions in gel form back in powder form.

Figure 4:
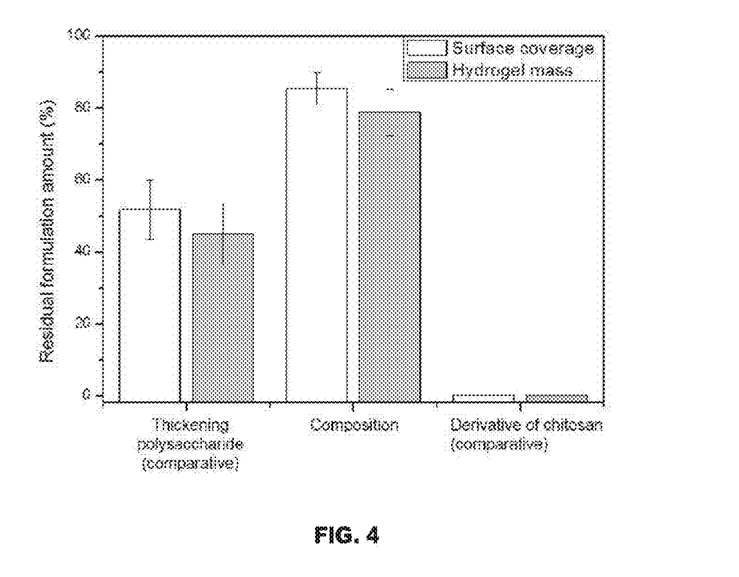
FIG. 4 shows the residual composition amount (%), evaluated according to Example 16, of the composition in gel form according to the invention prepared according to Example 9A and of the comparative compositions in gel form according to Examples 14 and 15, in terms of substrate surface coverage and composition mass, after being subjected to a water flow in standard conditions.

FIG. 4 shows the results of the comparative tests carried out on the compositions of Examples 9A (invention) and 14 and 15 (comparative).

FIG. 4 clearly shows that the composition in gel form according to the invention, comprising both the chitosan derivative disclosed herein and a biocompatible thickening polymer, has a much better adhesion performance in terms of a higher residual amount of the coating composition left on the substrate after the rinsing procedure with respect to the comparative gel compositions without the chitosan derivative or the biocompatible thickening polymer.

The results of the comparative testing reported in FIG. 4 also show an unexpected synergistic effect of the combination of the chitosan derivative and of a biocompatible thickening polymer disclosed herein.

The compositions according to the invention therefore achieve the desired properties of imparting to a biocompatible coating prepared from the same a good and long-lasting adhesion to the surface of a medical article such as an implantable medical article as disclosed herein.

Such an improved adhesion not only facilitates the spreading operations of the coating composition carried out on site in a sterile operating room, but also achieves the very important advantage of remaining in substantial amounts on the surface of the implantable medical article after insertion of the same into the tissues (for example, the bone tissues) of a patient.

This technical effect is particularly remarkable as it allows to prevent biofilm formation on the implanted medical article effectively hindering the development of implant-related infections until such time that the coating composition is completely absorbed by the body, i.e. until such time that the possibility of the onset of possible implant-related infections becomes acceptably low.

According to the invention, this technical effect may be further enhanced by providing the composition disclosed herein with antimicrobial substances, such as silver and/or an antibiotic, which may be advantageously released on-site as an additional measure to prevent or substantially hinder the development of implant-related infections.

According to the invention and as disclosed herein, other biologically-active substances such as Antimicrobial Peptides (AMPs), Platelet-rich plasma (PRP), phages, and any combination thereof, may be included in the biocompatible compositions disclosed herein and in the coating composition obtained therefrom thereby achieving other desired therapeutic effects such as avoiding antibiotic resistance (AMPs and phages) or promoting tissue regeneration (PRP).

Example 17—Cytocompatibility

The viability of cells after treatment with two compositions in gel form prepared according to Examples 9A and, respectively, 9G by reconstituting the composition in powder form of Example 8 as disclosed in any one of Examples 9A-9F, was evaluated by the colorimetric assay MTS (Cell-Titer 96® Aqueous One Solution Cell Proliferation Assay; Promega).

For this test, osteoblast (MG-63) cell lines were seeded on 24-well plates at the density of 25.000 cells/well. The day after seeding, the syringes containing the compositions in powder form of Examples 1 and 8 were rehydrated by syringe mixing as disclosed above, and the reconstituted compositions in gel form were employed for the treatment of cells. The compositions in gel form were weighed on filter paper (60 mg for each paper) and added to the wells. Incubation of cells with the formulations was allowed for 24 and 72 hours at 37° C.

As negative control, cells cultured in the presence of filter paper with no composition in gel form were considered. Cells treated with Triton X-100 (a compound that induces cellular lysis) at the concentration of 0.01% w/V was employed as positive control of cell death. Cells cultured in plain medium were considered as growth control.

At each time point, the MTS assay was performed: the cell medium was removed and the MTS was added to each well. The incubation of MTS with the cells was allowed for 4 hours at 37° C. in dark and the absorbance values of the samples, that correlate with the amount of viable cells, were read at 485 nm with a spectrophotometer. The cell viability of the growth control was considered as 100% and relative viability was calculated for all samples. For each series, four replicates were considered.

Figure 5:
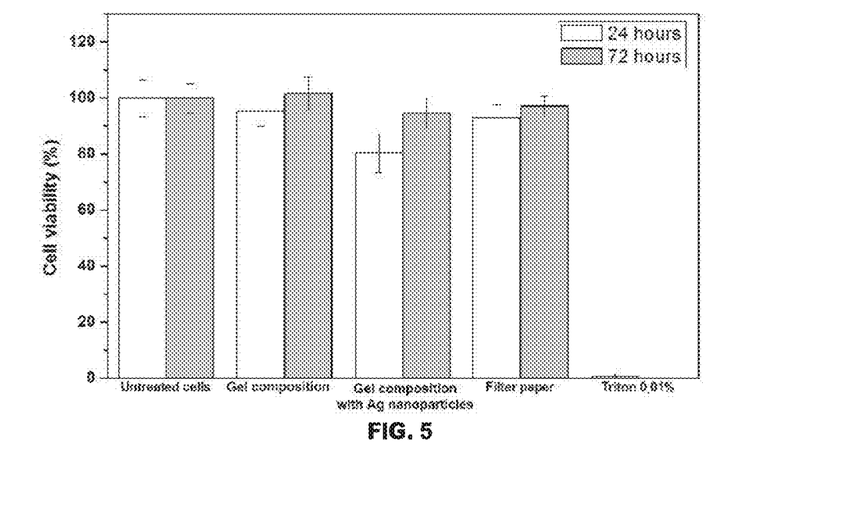
FIG. 5 shows the cell viability, evaluated according to Example 17, of MG-63 osteoblasts cultured in the presence of a composition prepared according to Example 9A and of a composition with silver nanoparticles prepared according to Examples 1 and 8, respectively.

The results obtained are illustrated in FIG. 5 and show that the viability of the osteoblasts in contact with both the compositions in gel form according to the invention was comparable with that of the positive controls at both time points (24 and 72 hours); as expected, cells treated with Triton displayed a time-dependent decrease of cell viability.

These results show that the compositions according to the invention do not display a measurable cytotoxic activities towards MG-63 osteoblasts in the experimental conditions adopted. These quantitative data were qualitatively supported by optical investigations of cultured cells, which showed that the cells treated with both the compositions according to the invention retain their stretched morphology without any visible sign of cell suffering.

Example 18—Antimicrobial Effect of a Composition Including Silver on S. aureus Bacteria A hydrogel formulation prepared by reconstituting the composition in powder form of Examples 1 and 8 as disclosed in Examples 9A and 9G, was employed to evaluate the antimicrobial effect of the material towards S. aureus bacteria. The formulation was transferred in a falcon tube and bacteria suspension (0.5 mL) was added at the final concentration of $1*10^7$ bacteria/mL. Untreated bacteria grown in Luria-Bertani medium (LB) and phosphate buffered saline (PBS)—LB:PBS (10:90)—were considered as growth control. The samples were incubated at 37° C. for 24 hours under shaking before plating on LB agar plates for colony counting units.

Figure 6:
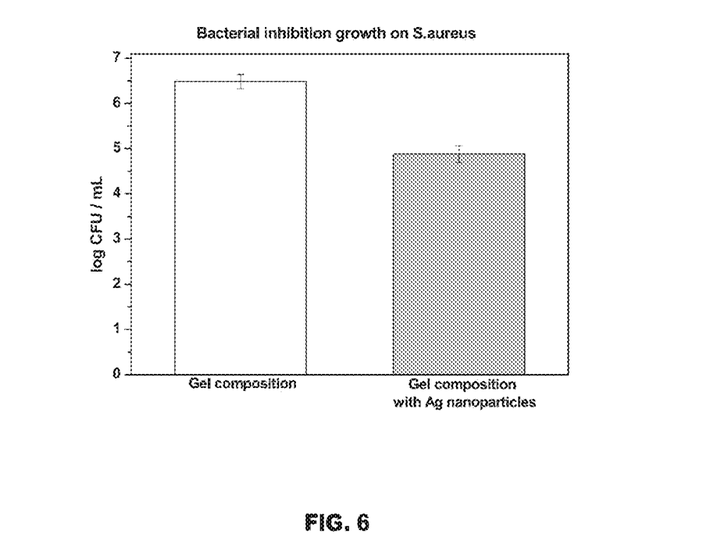
FIG. 6 shows the antimicrobial effect on *S. aureus* bacteria, evaluated according to Example 17, of the composition comprising silver nanoparticles prepared by reconstituting the composition in powder form according to Example 8 on *S. aureus* bacteria.

The results obtained are shown in FIG. 6, and showed that compositions including silver nanoparticles, achieved an effective and measurable antimicrobial activity, as the number of colony-forming units of S. Aureus was significantly lower than in compositions without silver nanoparticles.

The invention claimed is:

1. A biocompatible composition in powder form suitable for preparing a biocompatible composition in gel form, the composition in powder form comprising a biocompatible thickening polymer as a gelling agent and a chitosan derivative comprising D-glucosamine units of the following formula (I):

wherein X is an alditolic or aldonic polyol residue of an oligosaccharide, wherein said oligosaccharide is lactose, wherein said biocompatible thickening polymer is a non-ionic cellulosic polysaccharide selected from the group consisting of hydroxypropyl methyl cellulose (HPMC), methyl cellulose (MC), hydroxypropyl cellulose (HPC), ethyl cellulose (EC) and ethyl methyl cellulose (EMC), or mixtures thereof, and wherein said chitosan derivative synergistically interacts with said biocompatible thickening polymer to provide enhanced adhesion on a surface.

2. The composition according to claim 1, wherein the degree of derivatization of said chitosan derivative is between 10% and 95%.

3. The composition according to claim 1, wherein the degree of derivatization of said chitosan derivative is between 20% and 80%.

4. The composition according to claim 1, comprising an amount of the biocompatible thickening polymer equal to or higher than 25% by weight and equal to or lower than 50% by weight of the overall weight of the composition.

5. The composition according to claim 1, comprising an amount of the biocompatible thickening polymer equal to or higher than 34% by weight and equal to or lower than 48% by weight of the overall weight of the composition.

6. The composition according to claim 1, comprising an amount of the chitosan derivative equal to or higher than 10% by weight and equal to or lower than 40% by weight of the overall weight of the composition.

7. The composition according to claim 1, comprising an amount of the chitosan derivative equal to or higher than 20% by weight and equal to or lower than 35% by weight of the overall weight of the composition.

8. A method of preparing a biocompatible composition in gel form, comprising the steps of:
   a) providing a first container housing a composition in powder form according to claim 1;
   b) providing a second container housing an aqueous reconstituting solution;
   c) mixing the composition in powder form and the aqueous reconstituting solution to obtain a composition in gel form.

9. The method according to claim 8, further comprising the step of:
   d) allowing the composition in gel form obtained by step (c) to rest over a predetermined period of time.

10. The method according to claim 8, wherein said mixing step c) comprises:
    c1) transferring said aqueous reconstituting solution from the second container to the first container to dissolve the composition in powder form, thereby providing a reconstituted composition; and
    c2) transferring the reconstituted composition back into the second container.

11. The method according to claim 10, further comprising the step of:
    c3) repeating steps c1) and c2) so as to increase homogeneity of the reconstituted composition in gel form.

12. The method according to claim 8, wherein said aqueous reconstituting solution comprises water and a biologically-active substance.

13. A kit of parts for use in the preparation of a biocompatible coating in gel form for a medical article, comprising:
    a first container housing a composition in powder form according to claim 1;
    a second container configured to house an aqueous reconstituting solution.

14. The kit of parts according to claim 13, wherein said second container comprises an aqueous reconstituting solution comprising water and a biologically-active substance.

15. A method for applying a biocompatible coating onto a medical article, comprising the steps of:
    providing a first container housing the composition in powder form according to claim 1;
    providing a second container housing an aqueous reconstituting solution;
    mixing the composition in powder form and the aqueous reconstituting solution to obtain a composition in gel form; and
    applying said composition in gel form onto the medical article.

16. The method according to claim 15, wherein said medical article is an implantable biomedical article.

17. The method according to claim 16, wherein said implantable biomedical article is an articular prosthesis made at least in part of a metal alloy.

18. The method according to claim 17, wherein said articular prosthesis is a hip prosthesis or a knee prosthesis.

19. A biocompatible coating for a medical article, the coating comprising the composition according to claim 1.

* * * * *